(12) United States Patent
Choi et al.

(10) Patent No.: US 7,613,296 B2
(45) Date of Patent: Nov. 3, 2009

(54) M6 BLOCK CIPHER SYSTEM AND METHOD FOR ENCODING CONTENT AND AUTHENTICATING A DEVICE

(75) Inventors: Hong-Mook Choi, Incheon Metropolitan (KR); Mi-Jung Noh, Yongin-si (KR)

(73) Assignee: Samsung Electronics Co, Ltd., Gyeonggi-do (KR)

( * ) Notice: Subject to any disclaimer, the term of this patent is extended or adjusted under 35 U.S.C. 154(b) by 728 days.

(21) Appl. No.: 11/258,059

(22) Filed: Oct. 26, 2005

(65) Prior Publication Data

US 2006/0126834 A1  Jun. 15, 2006

(30) Foreign Application Priority Data

Nov. 26, 2004  (KR) .................... 10-2004-0097944

(51) Int. Cl.
*H04L 9/00* (2006.01)
(52) U.S. Cl. .............................. 380/37; 380/28; 380/29; 380/249; 380/250; 380/251; 380/252; 380/253; 380/254; 380/255; 380/262
(58) Field of Classification Search ............. 380/28–29, 380/37, 249–255, 262
See application file for complete search history.

(56) References Cited

U.S. PATENT DOCUMENTS

| | | | |
|---|---|---|---|
| 4,642,424 A * | 2/1987 | McNair ....................... 380/262 |
| 5,740,249 A | 4/1998 | Shimizu et al. | |
| 6,185,304 B1 * | 2/2001 | Coppersmith et al. ......... 380/37 |
| 6,199,052 B1 * | 3/2001 | Mitty et al. .................... 705/75 |
| 6,324,288 B1 * | 11/2001 | Hoffman ..................... 380/249 |
| 6,850,252 B1 * | 2/2005 | Hoffberg ..................... 715/716 |
| 6,914,983 B2 * | 7/2005 | Chen et al. ..................... 380/28 |

OTHER PUBLICATIONS

John Kelsey, Bruce Schneier, David Wagner (Mar. 1999). "Mod n Cryptanalysis, with Application Against RC5P and M6".*
German Office Action dated Apr. 23, 2009, for corresponding German Patent Application No. 10 2005 056 815.7-31.

* cited by examiner

*Primary Examiner*—Carl Colin
*Assistant Examiner*—Ghazal Shehni
(74) *Attorney, Agent, or Firm*—Harness, Dickey & Pierce, P.L.C.

(57) ABSTRACT

An M6 block cipher system and method for encoding content and authenticating a device may use an M6 core. The M6 block cipher system may include a rotate constant selector selecting one or more rotate constants from a plurality of input rotate constants for output based on a selection signal input thereto, a rotate constant ordering device ordering the selected rotate constants and a common rotate constant input thereto based on a received ordering signal and an M6 core generating one or more of an output signal, a validity signal and a round number based on the ordered rotate constants and a plurality of input signals. The system may include a rotate constant scheduler outputting the ordering signal to the rotate constant ordering device in response to the selection signal and the round number.

43 Claims, 8 Drawing Sheets

M6 BLOCK CIPHER SYSTEM AND METHOD FOR ENCODING CONTENT AND AUTHENTICATING A DEVICE

PRIORITY STATEMENT

This application claims the benefit of Korean Patent Appl. No. 10-2004-0097944, filed on Nov. 26, 2004 in the Korean Intellectual Property Office, the disclosure of which is incorporated herein in its entirety by reference.

BACKGROUND OF THE INVENTION

1. Field of the Invention

The present invention relates in general to an M6 block cipher system and a method for encoding content and performing authentication of a device.

2. Description of the Related Art

If various forms of audio/video data (hereinafter referred to as content) are transmitted by a data bus, it is possible for a third party to intercept or tamper with the content. Even if an IEEE 1394 high-performance bus is used, interception and/or tampering with the content may still be possible. However, a digital transmission content protection (DTCP) specification volume 1.3, proposed by Hitachi, Intel, Matsushita, Sony and Toshiba, provides a cryptographic protocol for content protection from external attacks.

In order to protect content from external attacks, a M6 block cipher algorithm is used for DTCP. A general M6 block cipher algorithm generates a random number, creates an exchange key and encodes content, which may be necessary processes for the content authentication between reception and transmission devices. A general M6 block cipher algorithm system contains two cores for respectively encoding content and authenticating the device. The general M6 block cipher algorithm system may be divided into M6-S56 and M6-KE56 algorithms. The M6-S56 algorithm is a block cipher algorithm used to encode content, and the M6-KE56 algorithm is a block cipher algorithm used to authenticate a device. The M6 block cipher algorithm supports a 64-bit block having a 56-bit key and composed of 10 rounds in total.

A conventional cipher algorithm implements a M6-S56 converted cipher-block chaining (C-CBC) cipher of the M6 block cipher algorithm used for the DTCP. However, the conventional art does not use the M6-KE56 algorithm to generate a random number and create the exchange key for authentication. In addition, the conventional art does not describe nor suggest using a round function or a Pi function for the implementation of M6-S56. Further, a general M6 block cipher algorithm system contains two cores for respectively encoding content and authenticating the device.

SUMMARY OF THE INVENTION

An example embodiment of the present invention is directed to an M6 block cipher system. The M6 block cipher system may include a rotate constant selector selecting one or more rotate constants from a plurality of input rotate constants for output based on a selection signal input thereto, a rotate constant ordering device ordering the selected rotate constants and a common rotate constant input thereto based on a received ordering signal, and an M6 core generating one or more of an output signal, a validity signal and a round number based on the ordered rotate constants and a plurality of input signals. The system may include a rotate constant scheduler outputting the ordering signal to the rotate constant ordering device in response to the selection signal and the round number.

Another example embodiment of the present invention is directed to an M6 block cipher system. The system may be adapted to perform a plurality of round operations in order to authenticate a device for receiving/transmitting content and encode content, in which each of the plurality of round operations includes a plurality of sub round operations. The M6 block cipher system may include a rotate constant selector selecting one or more rotate constants from a plurality of input rotate constants for output based on a selection signal input thereto, a rotate constant ordering device ordering, for output, the selected rotate constants, a common rotate constant input thereto and a non-common rotate constant input thereto based on a received ordering signal, and an M6 core generating one or more of an output signal, a validity signal, a round number and a sub round number based on the ordered rotate constants and a plurality of input signals. The system may include a rotate constant scheduler outputting the ordering signal to the rotate constant ordering device in response to the selection signal, the round number and the sub round number.

Another example embodiment of the present invention is directed to an M6 block cipher system for encoding content and performing authentication of a device. The system may include an M6 core configured to adjust a value of a rotate constant selection signal so as to encode content input to the system based on selected rotate constants, to generate a random number and to create an exchange key for device authentication.

Another example embodiment of the present invention is directed to method of encoding content and performing authenticating of a device. In the method, one or more rotate constants may be selected from a plurality of input rotate constants for output based on a selection signal. The selection signal may be configured to determine whether to encode content or to generate a random number and create an exchange key for device authentication. The selected rotate constants and one or both of a separate common rotate constant used to encode content and for device authentication, and a separate non-common rotate constant used when an output signal is not rotated, may be ordered based on an ordering signal. The method includes generating one or more of an output signal, a validity signal and at least one of a round number and a sub round number based on the ordered rotate constants and a plurality of input signals. The ordering signal may be generated based on the selection signal and one or both of the round number and sub round number.

BRIEF DESCRIPTION OF THE DRAWINGS

Example embodiments of the present invention will become more fully understood from the detailed description given herein below and the accompanying drawings, wherein the like elements are represented by like reference numerals, which are given by way of illustration only and thus are not limitative of the example embodiments the present invention.

DETAILED DESCRIPTION OF THE EXAMPLE EMBODIMENTS

As will be shown in further detail below, the example embodiments of the present invention may provide an M6 block cipher system adapted to prevent illegal copying while data are transmitted in a high-performance digital bus. In other words, the M6 block cipher system can realize operations to encode content and authenticate a device. At the same time, an M6 block cipher system only uses a single M6 core so as to have relatively smaller volume.

Figure 1:
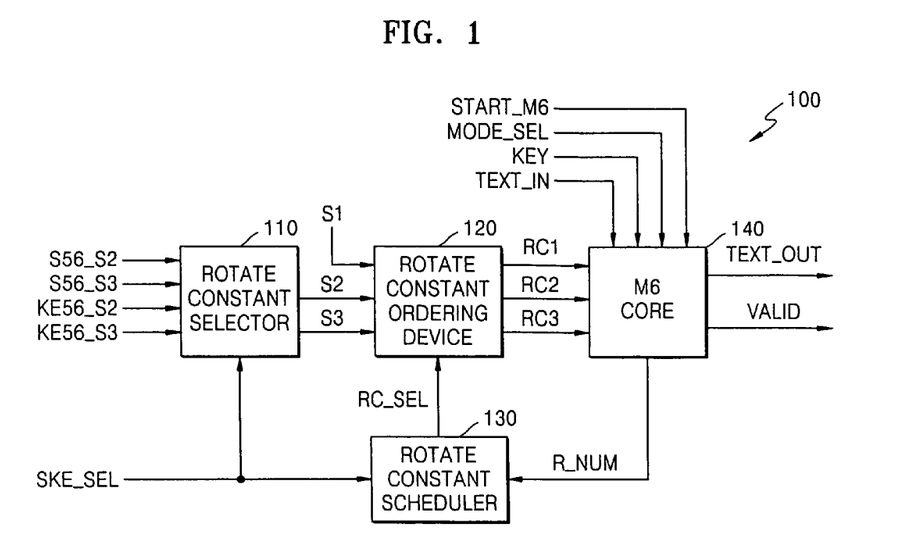
FIG. 1 is a block diagram of an M6 block cipher system according to an example embodiment of the present invention.

FIG. 1 is a block diagram illustrating an M6 block cipher system 100 according to an example embodiment of the present invention. The M6 block cipher system 100 may be configured to adjust the value of a SKE selection signal SKE_SEL so as to encode content M6_S56, generate a random number and create an exchange key M6_KE56 necessary for device authentication. Unlike the conventional art, only one M6 core 140 is used for this purpose, while two cores are used in the conventional art.

Referring to FIG. 1, an M6 block cipher system 100 may include a rotate constant selector 110. The rotate constant selector 110 may be configured to select among a plurality of rotate constants S56_S2, S56_S3, KE56_S2 and KE56-S3 in response to a SKE selection signal SKE_SEL (e.g., "selection signal") so as to output rotate constants S2 and S3. The SKE selection signal SKE_SEL may be used to determine whether to encode content M6_S56 or to generate a random number and create an exchange key M6_KE56 necessary for device authentication. In the four rotate constants S56_S2, S56_S3, KE56_S2 and KE56-S3, two rotate constants S56_S2 and S56_S3 may be used to encode content, and two rotate constants KE56_S2 and KE56-S3 may be used to generate a random number and create an exchange key necessary for device authentication.

The M6 block cipher system 100 may include a rotate constant ordering device 120. The rotate constant ordering device 120 may be configured to order the input rotate constants S1, S2 and S3 so as to output RC1, RC2 and RC3 in response to a rotate constant selection signal RC_SEL (e.g., "ordering signal"). The common rotate constant S1 may be commonly used to encode content and to authenticate the device.

The M6 block cipher system may include a rotate constant scheduler 130. The rotate constant scheduler 130 may be configured to output a rotate constant selection signal RC_SEL that may be used to decide the order of the rotate constants to be used for a round operation in response to the SKE selection signal SKE_SEL and a round number R_NUM. The round number R_NUM may contain information of a present round operation.

The M6 block cipher system 100 may include a M6 core 140. The M6 core 140 may be configured to encode or decode an input signal TEXT_IN in response to the plurality of ordered rotate constants RC1, RC2 and RC3, a key signal KEY and a mode selection signal MODE_SEL so as to output signal TEXT_OUT. The M6 core may also output a round number R_NUM containing information on the present round operation, and a validity signal VALID that may indicate an end of encoding and/or decoding process and the validity of an encoded and/or decoded value.

The key signal KEY may be used to create two round operation keys necessary for each round operation of the M6 core 140. The mode selection signal MODE_SEL may be used to indicate whether to encode or decode the input signal TEXT_IN. If the input signal TEXT_IN is plain text, the mode selection signal MODE_SEL may instruct the M6 core to encode the input signal TEXT_IN. If the input signal TEXT_IN is cipher text, the mode selection signal MODE_SEL may instruct the M6 core to decode the input signal TEXT_IN. Operation start signal START_M6 may be used to instruct the M6 core 140 to start operating. The M6 block cipher system 100 performs a single round during each of clock cycle, and may include 10 rounds in total, for example.

Figure 2:
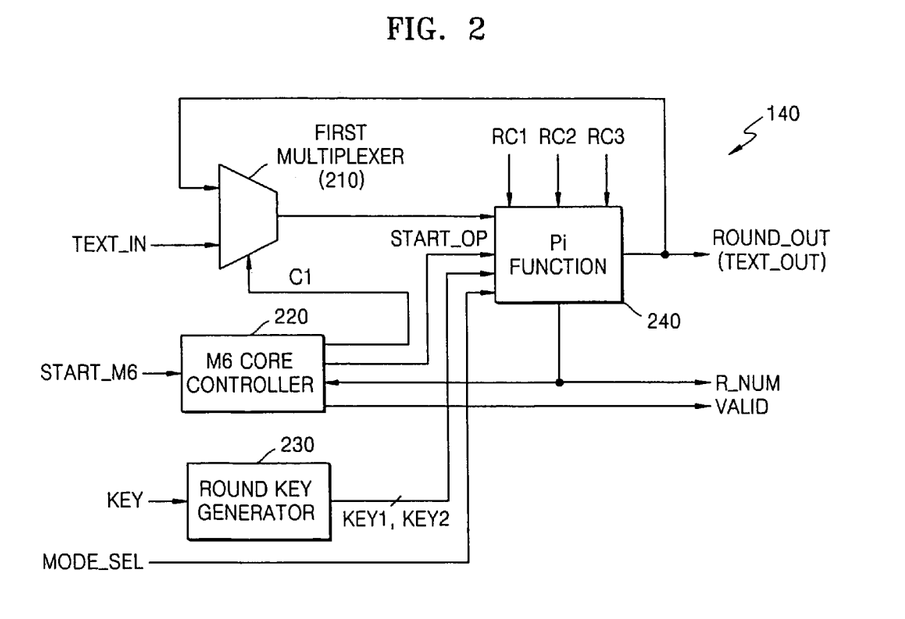
FIG. 2 is a block diagram illustrating the M6 core of FIG. 1.

FIG. 2 is a block diagram illustrating the M6 core 140 in FIG. 1. Referring to FIG. 2, the M6 core 140 may include a first multiplexer 210 and an M6 core controller 220. The first multiplexer 210 may select one of the input signals TEXT_IN and ROUND_OUT in response to a first control signal C1 so as to output one of the input signals. The M6 core controller 220 may output an operation start signal START_OP, a first control signal C1 and a validity signal VALID corresponding to the round number R_NUM and the operation start signal START_M6.

The operation start signal START_OP may instruct a Pi function 240 to perform a round operation. The first control signal C1 may instruct the first multiplexer 210 to select the input signal TEXT_IN in a first round operation and to select the round output signal ROUND_OUT in subsequent round operations. The validity signal VALID may indicate the end of encoding and/or decoding and the validity of the encoded and/or decoded value. The M6 core controller 220 may further receive the operation start signal START_M6 that may instruct the M6 core 140 to start operating, and further output the operation start signal START_OP.

The M6 core may include a round key generator 230 and a Pi function 240. The round key generator 230 may generate two operation keys Key1 and Key 2 corresponding to the key signal KEY. In response to rotate constants RC1, RC2 and RC3, two operation keys Key1 and Key 2 and the mode selection signal MODE_SEL, the Pi function 240 may perform a round operation on the first multiplexer 210 output signal to generate a round output signal ROUND_OUT and a round number R_NUM. If the round output signal ROUND_OUT is a final round output signal, the output signal TEXT_OUT may be a final output signal of the M6 core 140.

Figure 3:
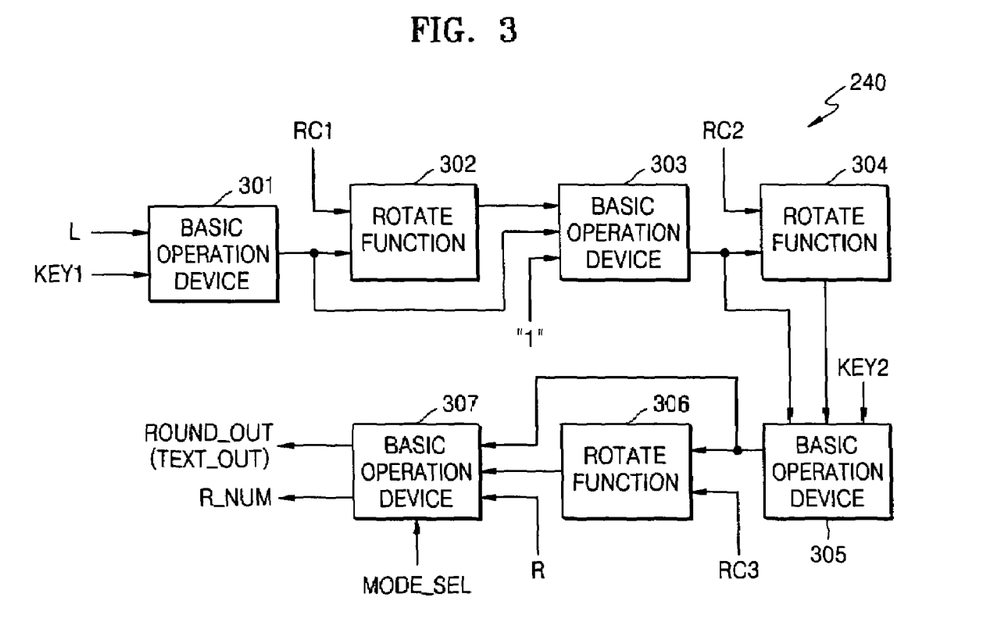
FIG. 3 is a block diagram of the Pi function of FIG. 2.

FIG. 3 is a block diagram illustrating the Pi function 240 of FIG. 2. The Pi function 240 may divide the 64-bit first-multiplexer 210 output signal into a consecutive 32-bit first data stream L and a 32-bit second data stream R.

Referring to FIG. 3, the Pi function 240 may include first through the fourth basic operation devices 301, 303, 305 and 307, and first through third rotate functions 302, 304 and 306. The basic operation may be exemplified as any of an add operation, a subtraction operation, a XOR operation according to the locations of the basic operation devices 301, 303, 305 and 307, etc.

The first basic operation device 301 may use the first round operation key Key 1 and the first data stream L to perform a basic operation. The first rotate function 302 rotates a first basic operation device 301 output signal a number of positions where the rotation number may equal the value of the first rotate constant RC1.

The second basic operation device 303 may use a first rotate function 302 output signal, the first basic operation device 301 output signal and a constant "1" to perform a basic operation. The second rotate function 304 may rotate a second basic operation device 303 output signal a number of positions, where the rotation number may equal the value of the second rotate constant RC2.

The third basic operation device 305 may use a second basic operation device 303 output signal, a second rotate function 304 output signal and the second round operation key Key 2 to perform a basic operation. The third rotate function 306 may rotate the third basic operation device 305 output signal a number of positions, where the rotation number may equal the value of the third rotate constant RC3.

The fourth basic operation device 307 may perform a basic operation by employing the mode selection signal MODE_SEL, a third basic operation device 305 output signal, a third rotate function 306 output signal and a second data stream R, for outputting a round number R_NUM containing information on the present round operation, and for outputting the ROUND_OUT output signal (e.g., TEXT_OUT) which is the final output signal. The TEXT_OUT signal may be the final output signal if the ROUND_OUT output signal is a final round output signal, as described above.

Figure 4:
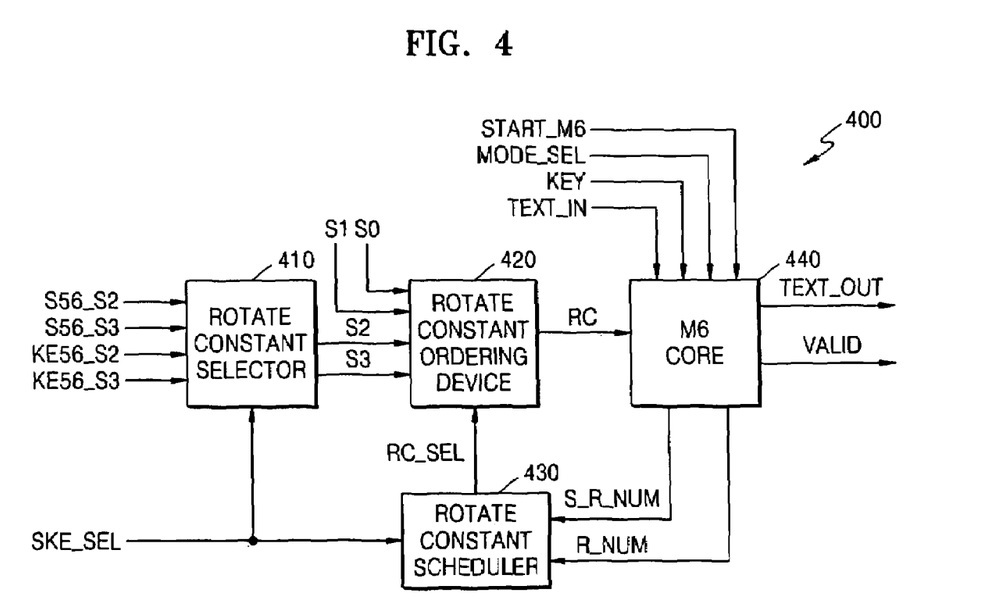
FIG. 4 is a block diagram of an M6 block cipher system according to another example embodiment of the present invention.

FIG. 4 is a block diagram of an M6 block cipher system 400 according to another example embodiment of the present invention. Referring to FIG. 4, an M6 block cipher system 400 may perform a plurality of round operations in order to authenticate devices for receiving and/or transmitting content and to encode content.

The M6 block cipher system may include a rotate constant selector 410. The rotate constant selector 410 may select from among rotate constants S56_S2, S56_S3, KE56_S2 and KE56-S3 in response to a SKE selection signal SKE_SEL, and to output rotate constants S2 and S3. The SKE selection signal SKE_SEL may be used to determine whether to encode content M6_S56 or to generate a random number and an exchange key M6_KE56 for device authentication. In the rotate constants S56_S2, S56_S3, KE56_S2 and KE56-S3, two rotate constants S56_S2 and S56_S3 may be used to encode content, and two rotate constants KE56_S2 and KE56-S3 may be used to generate a random number and an exchange key for device authentication.

The M6 block cipher system 400 may include a rotate constant ordering device 420 and a rotate constant scheduler 430. The rotate constant ordering device 420 may order the received rotate constants S2 and S3, a common rotate constant S1 and a non-common rotate constant S0, and to output a rotate constant RC in response to a rotate constant selection signal RC_SEL. The common rotate constant S1 may be commonly used to encode content and authenticate the device. The non-common rotate constant S0 may be used when an output signal is not rotated.

The rotate constant scheduler 430 may output a rotate constant selection signal RC_SEL which may decide the order of the rotate constants used for a round operation in response to an SKE selection signal SKE_SEL, a round number R_NUM and a sub round number S_R_NUM. The round number R_NUM may contain information on the present round operation and the sub round number S_R_NUM may contain information on a present sub round operation performed in the present round.

The M6 block cipher system 400 may include an M6 core 440. The M6 core 440 may encode or decode an input signal TEXT_IN in response to the rotate constant RC, a key signal KEY, a mode selection signal MODE_SEL, a round number R_NUM, a sub round number S_R_NUM and a validity signal VALID so as to output signal TEXT_OUT. The round number R_NUM may contain information on the present round operation and the S_R_NUM may contain information on the present sub round operation. The validity signal VALID may indicate the end of encoding and/or decoding and the validity of the encoded and/or decoded value. The key signal KEY may be used to create two round operation keys necessary for each round operation performed in the M6 core 440. The mode selection signal MODE_SEL may be used to instruct the M6 core 440 to encode or decode the input signal TEXT_IN.

If the input signal TEXT_IN is plain text, the mode selection signal MODE_SEL may instruct the M6 core 440 to encode the input signal TEXT_IN. If the input signal TEXT_IN is cipher text, the mode selection signal MODE_SEL may instruct the M6 core 440 to decode the input signal TEXT_IN. An operation start signal START_M6 may instruct the M6 core 440 to start operating.

The M6 block cipher system 400 shown in FIG. 4 may perform a single round during a plurality of clock cycles, and may include 10 rounds in total. The plurality of clock cycles may be necessary for a single round because each single round is divided into a plurality of sub rounds. Each of the sub rounds may be performed during a single clock cycle.

Figure 5:
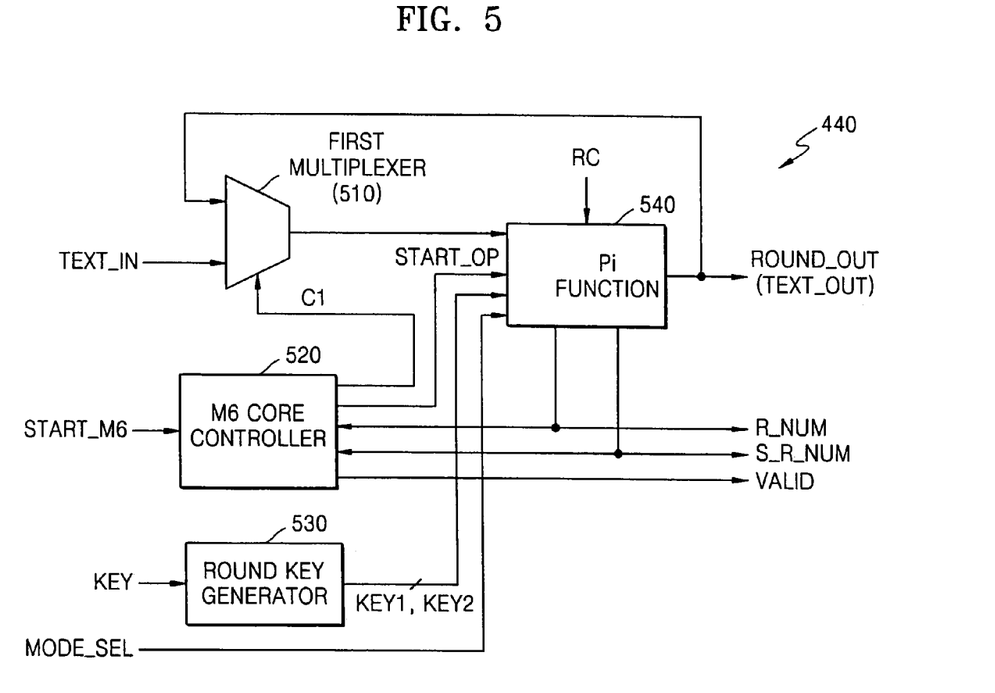
FIG. 5 is a block diagram of the M6 core of FIG. 4.

FIG. 5 is a block diagram of the M6 core 440 shown in FIG. 4. Referring now to FIG. 5, the M6 core 440 may include a first multiplexer 510 and an M6 core controller 520. The first multiplexer 510 may select and output one of the input signal TEXT_IN and a round output signal ROUND_OUT in response to a first control signal C1. By employing the round number R_NUM, the sub round number S_R_NUM and the operation start signal START_M6, the M6 core controller 520 may output an operation start signal START_OP, the first control signal C1 and the validity signal VALID. The operation start signal START_OP may instruct a Pi function 540 to perform a round operation. The first control signal C1 may be used to instruct the first multiplexer 510 to select the input signal TEXT_IN in a first round operation, and to select the round output signal ROUND_OUT in other round operations. The validity signal VALID may indicate an end of encoding and/or decoding and the validity of the encoded and/or decoded value. The M6 core controller 520 may further receive the operation start signal START_M6 instructing the M6 core 440 to start operating.

The M6 core 440 may include a round key generator 530 and a Pi function 540. The round key generator 530 may generate two operation keys Key1 and Key 2 in response to the signal KEY. The Pi function 240 may perform round operation on an first multiplexer 510 output signal corresponding to the operation start signal START_OP, the rotate constant RC, the two operation keys Key1 and Key 2 and the mode selection signal MODE_SEL so as to output a round number R_NUM, a sub round number S_R_NUM and a round output signal ROUNT_OUT. If the round output signal ROUND_OUT is a final round output signal, the round output signal TEXT _OUT is a final output signal of the M6 core 440.

Figure 6:
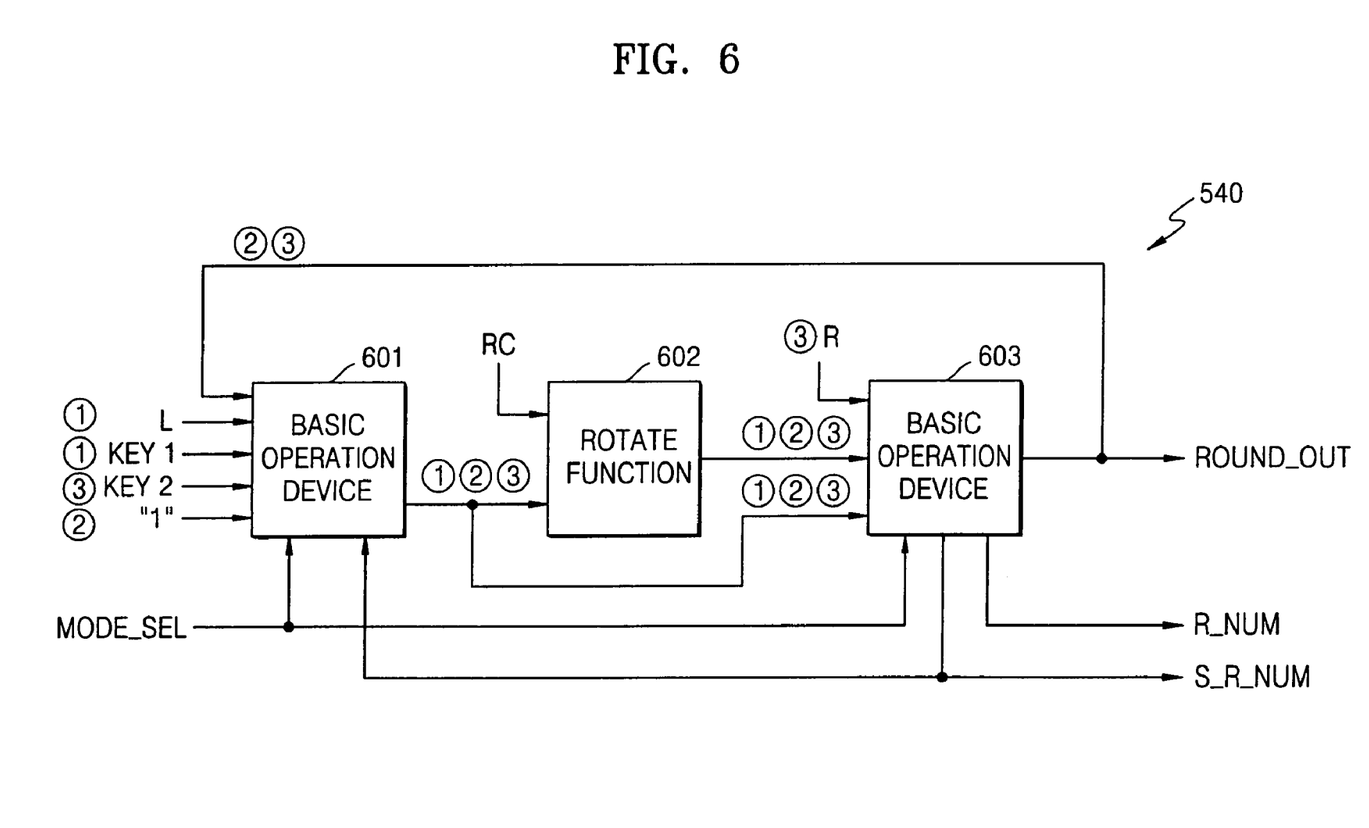
FIG. 6 is a block diagram of the Pi function of FIG. 5.

FIG. 6 is a block diagram of the Pi function 540 shown in FIG. 5. Referring now to FIG. 6, the Pi function 540 may include a first basic operation device 601, a rotate function 602 and a second basic operation device 603 for three sub round operations. Circled numbers in FIG. 6 indicates signals processed during the sub rounds.

Employing the two round operation keys Key1 and Key 2, a constant "1" and a first data stream L, the first basic operation device 601 may perform a basic operation. The rotate function 602 may rotates a first basic operation device 601 output signal where the position rotation number may equal a value of the rotate constant RC. The second basic operation device 603 may use an output signal of the rotate function 602, the output signal of the first basic operation device 601 and a second data stream R to perform the basic operation. The first basic operation device 601 may operate in response to the mode selection signal MODE_SEL and the sub round number S_R_NUM. The second basic operation device 603 may generate a sub round number S_R_NUM and a round number R_NUM. The basic operation may be an add operation, a subtraction operation, or a XOR operation.

The operation of the first basic operation device 601 and the second basic operation device 603 is as described below. The first basic operation device 601 may perform a basic operation on the first round operation key Key1 and the first data stream L during a first sub round of each round, a basic operation on the output signal ROUND_OUT of the second basic operation device 603 and the constant "1" during a second sub round of each round and a basic operation on the second round operation key Key2 and the output signal ROUND_OUT of the second basic operation device 603 at the third sub round of each round. The second basic operation device 603 may use the second data stream R in the basic operation during a final sub round of each round.

Figure 7:
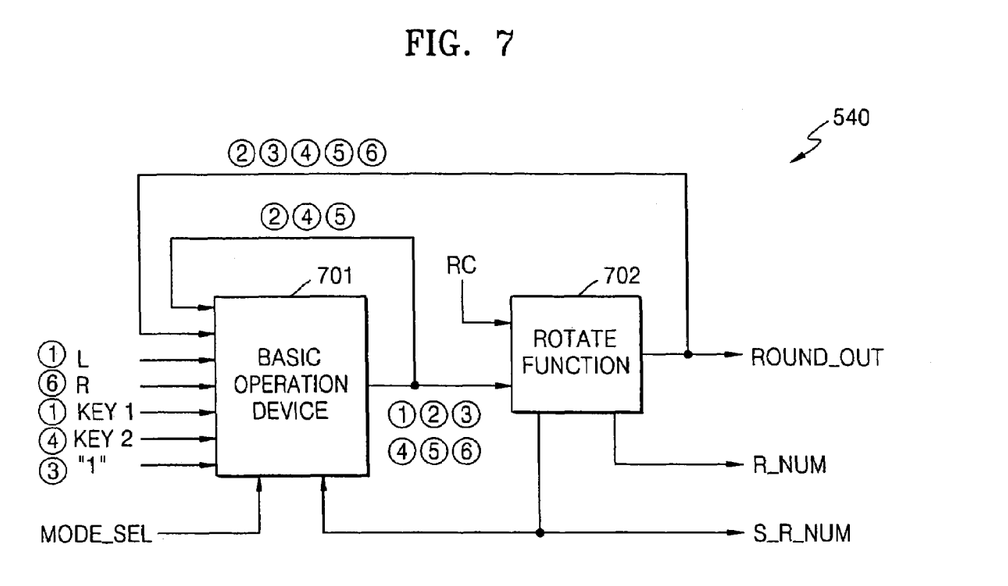
FIG. 7 is a block diagram of the Pi function of FIG. 5 according to another example embodiment of the present invention.

FIG. 7 is a block diagram of the Pi function 540 according to another sample embodiment of the present invention. Referring to FIG. 7, the Pi function 540, which may perform six sub rounds, may include a basic operation device 701 and a rotate function 702. Circled numbers in FIG. 7 indicate signals processed during the sub rounds.

The basic operation device 701 may have the same function as the first basic operation device 601 and the rotate function 702 may be of the same function of the rotate function 602. The basic operation on the first data stream L and the first round operation key Key1 may be performed in a first round, and data that have been rotated based on the corresponding rotate constant may be generated. The generated data may be input to the basic operation device 701, which may perform operations on the generated data in the order indicated by the circled numbers. The rotate function 702 may output the round number R_NUM and the sub round number S_R_NUM containing information on the present round and sub round, respectively.

Figure 8:
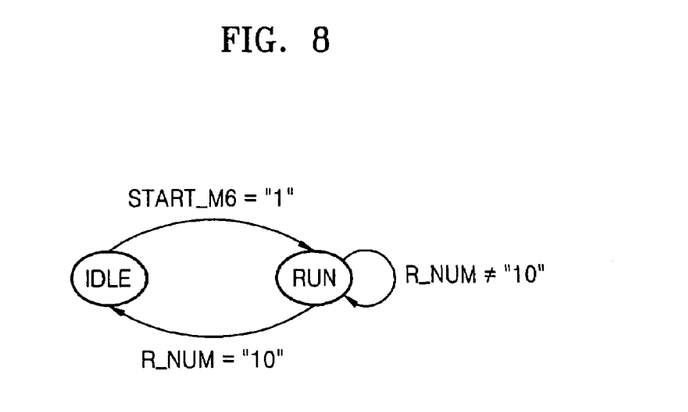
FIG. 8 is a state diagram illustrating an M6 block cipher system that does not perform a sub round operation according to an example embodiment of the present invention.

FIG. 8 is a state diagram illustrating an M6 block cipher system that does not perform the sub round operation according to an example embodiment of the present invention. Referring to FIG. 8, the M6 block cipher system may perform a single round during each clock cycle and it has two states indicating as an idle state IDEL and a run state RUN. The M6 block cipher system may be in the idle state IDLE if R_NUM=10, and be in the run state RUN if the operation signal START_M6 is enabled ("1"). If the value of the round number R_NUM is less than 10, the M6 block cipher system may remain in the run state RUN, and if the value of the round number R_NUM is 10, the M6 block cipher system may enter the idle state IDLE.

Figure 9:
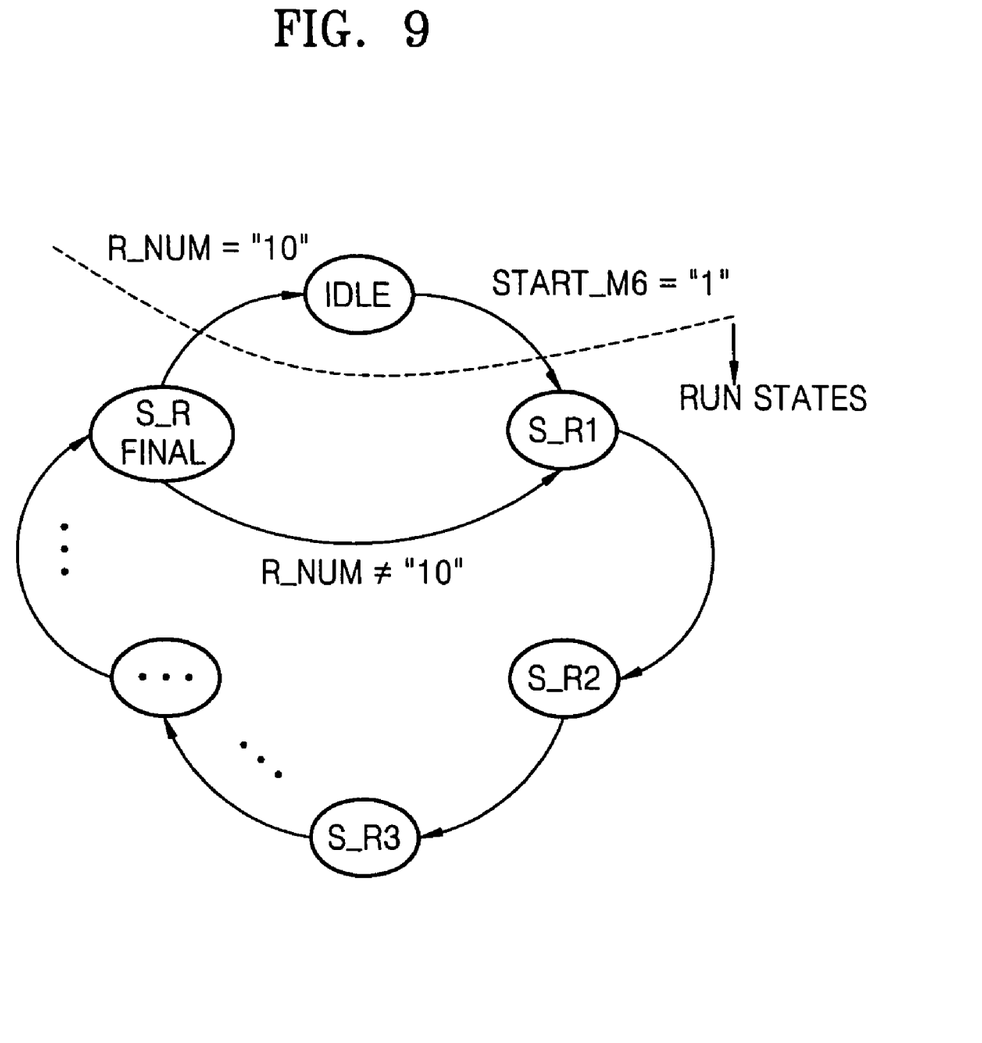
FIG. 9 is a state diagram illustrating an M6 block cipher system that performs a plurality of sub round operations according to an example embodiment of the present invention.

FIG. 9 is a state diagram of an M6 block cipher system that performs a plurality of sub round operations according to an example embodiment of the present invention. Referring to FIG. 9, the M6 block cipher system may use a single sub round for a single clock cycle and the system has a run state as it has a plurality of sub run states S_R1, S_R2 . . . of the run state RUN. The M6 block cipher system using the plurality of sub rounds may end a round if all of the plurality of sub run states S_R1, S_R2 . . . , S_R final are completed.

Figure 10:
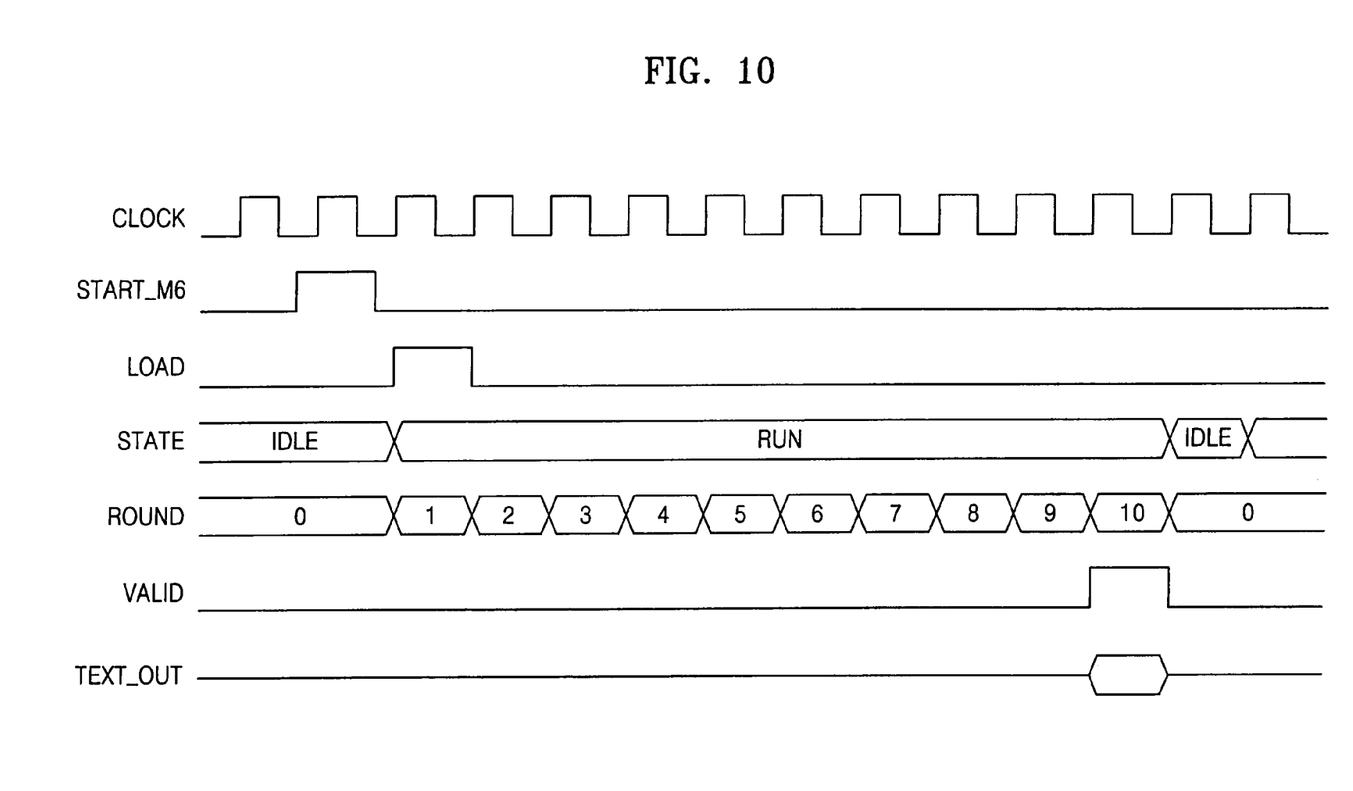
FIG. 10 is a timing diagram illustrating an M6 block cipher system that does not perform the sub round operation according to an example embodiment of the present invention.

FIG. 10 is a timing diagram illustrating an M6 block cipher system that does not perform a sub round operation according to another example embodiment of the present invention. Referring now to FIG. 10, the M6 block cipher system at the idle state IDLE may start operating in response to the operation start signal START_M6 and enter the run state RUN while loading data simultaneously. The run state RUN may include 10 rounds. The M6 block cipher system may perform a round operation during each clock cycle and output the validity signal VALID and the signal TEXT_OUT during the final round.

Figure 11:
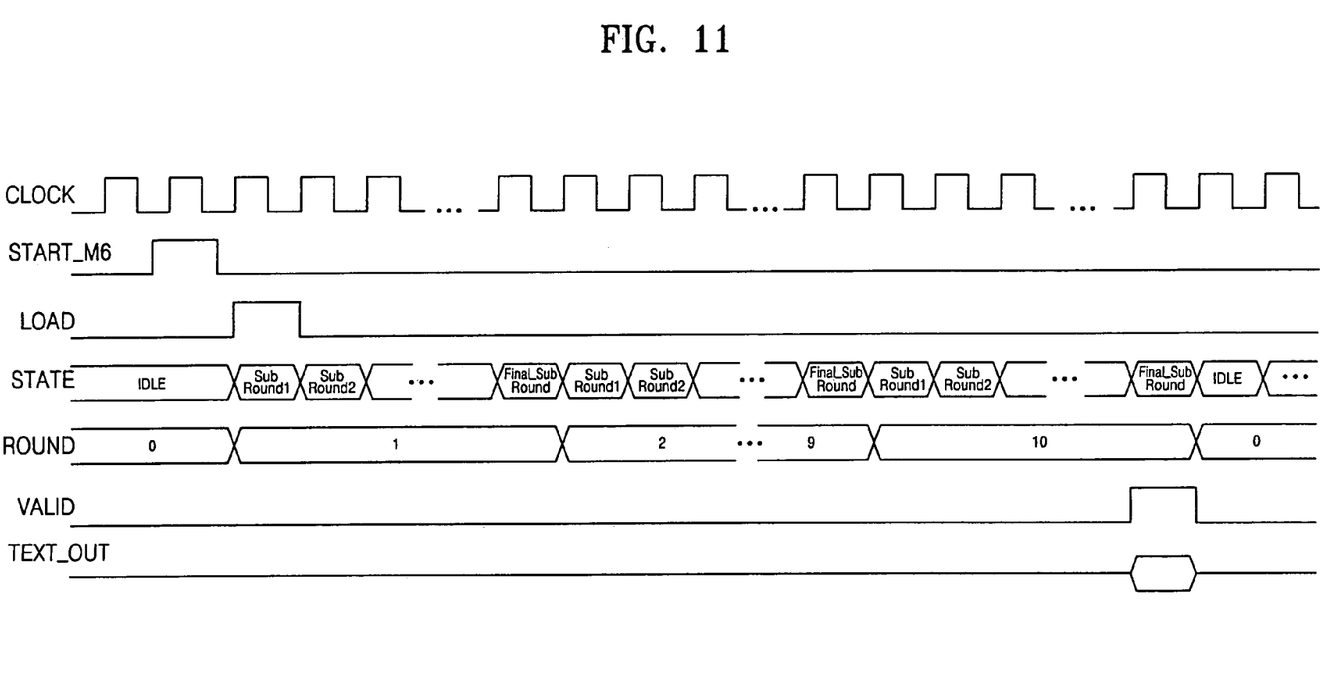
FIG. 11 is a timing diagram illustrating an M6 block cipher system that performs a plurality of sub round operations according to an example embodiment of the present invention.

FIG. 11 is a timing diagram of the M6 block cipher system that may perform a plurality of sub round operations according to an example embodiment of the present invention. Referring to FIG. 11, the M6 block cipher system may perform the same operations as the M6 block cipher system described with reference to FIG. 10, except that a round is composed of a plurality of sub rounds, i.e., Sub Round 1 through Final Sub Round.

Since sub rounds have its advantages and disadvantage at the same time, the sub rounds may be used in the M6 cipher system according to the system requirements. The M6 block cipher system having no sub round has a short clock cycle whereas the M6 block cipher system with sub rounds can be realized with a smaller circuit. The M6 block cipher system may properly use sub rounds according to factors such as operating speed and hardware volume, etc. Although the M6 block cipher systems with three sub rounds and six sub rounds have been described, it is also found that an M6 block cipher system having four sub rounds may be effective.

Therefore, the example embodiments of the present invention provide an M6 block cipher system that uses a core to encode content and authenticate a device, where the duration of a round is a single clock cycle. The example embodiments of the present invention also provide an M6 block cipher system that uses a single core to encode content and authenticate a device, where the duration of a round is a plurality of clock cycles by dividing each round into a plurality of sub-rounds.

While example embodiments of the present invention have been particularly shown and described, it will be understood by those of ordinary skill in the art that various changes in form and details may be made therein without departing from the spirit and scope of the example embodiments of the present invention, as defined by the following claims.

What is claimed is:

1. An M6 block cipher system, comprising:
   a rotate constant selector device selecting one or more rotate constants from a plurality of input rotate constants for output based on a selection signal input thereto,
   a rotate constant ordering device ordering the selected rotate constants and a common rotate constant input thereto based on a received ordering signal,
   an M6 core device generating one or more of an output signal, a validity signal and a round number based on the ordered rotate constants and a plurality of input signals, and a rotate constant scheduler device outputting the ordering signal to the rotate constant ordering device in response to the selection signal and the round number.

2. The system of claim 1, wherein the selection signal determines whether to encode content or to generate a random number and create an exchange key for device authentication.

3. The system of claim 1, wherein the plurality of rotate constants input to the rotate constant selector includes two rotate constants used to encode content, and two rotate constants used to generate the random number and create an exchange key for device authentication.

4. The system of claim 1, wherein the ordering signal indicates the order of the selected rotate constants to be used for a round operation.

5. The system of claim 1, wherein the common rotate constant is used to encode content and for device authentication.

6. The system of claim 1, wherein the input signals to the M6 core include one or more of an input text signal, a key signal, an operation start signal and a mode selection signal.

7. The system of claim 1, wherein the input signals to the M6 core include each of a key signal, an operation start signal, a mode selection signal and an input text signal.

8. The system of claim 7, wherein the operation start signal instructs the M6 core to start operation,
the key signal is used to create two round operation keys, one key for each round of operation of the M6 core, and
the mode selection signal instructs the M6 core as to whether to encode or decode a given input text signal.

9. The system of claim 8, wherein
if the given input text signal is plain text, the mode selection signal instructs the M6 core to encode the input plain text signal, else
if the given input text signal is cipher text, the mode selection signal instructs the M6 core to decode the input cipher text signal.

10. The system of claim 1, wherein the M6 core outputs each of an output signal, a validity signal and a round number based on the ordered rotate constants and plurality of input signals.

11. The system of claim 10, wherein
the round number contains information on a present round operation,
the output signal is generated by encoding or decoding the one a given input text signal contained in the input signals to the M6 core, and
the validity signal indicates an end of encoding and decoding and the validity of an encoded or decoded value in response to a given rotate constant.

12. The system of claim 1, wherein the M6 block cipher system performs a single round during a single clock cycle.

13. The system of claim 1, wherein the M6 core comprises:
a first multiplexer which, in a first round operation, selects one of the input signals and a round output signal for output, in response to a first control signal,
an M6 core controller generating the first control signal that instructs the first multiplexer to select a given input signal in the first round operation, the round output signal in another round operation, and the validity signal in response to the round number,
a round key generator generating first and second round operation keys in response to a key signal used to create the two round operation keys, one key for each round of operation of the M6 core, and
a Pi function generating the round output signal by performing a round operation on an output signal of the first multiplexer and outputting the round output signal and the round number in response to the ordered rotate constants, the first and second operation keys, and a mode selection signal to instruct the M6 core as to whether to encode or decode a given one of the input signals.

14. The system of claim 13, wherein the M6 core further receives a first operation start signal that instructs the M6 core to start operating, and the M6 core controller operates in response to the first operating start signal.

15. The system of claim 13, wherein the M6 core controller further outputs a second operation start signal that instructs the Pi function to perform the round operation.

16. The system of claim 13, wherein
an output signal of the first multiplexer is divided into consecutive first and second data streams, and
the Pi function comprises:
a first basic operation device performing a basic operation using the first round operation key and the first data stream,
a first rotate function rotating an output signal of the first basic operation device a number of positions equal to the value of a first ordered rotate constant of the ordered rotate constants,
a second basic operation device performing the basic operation using an output signal of the first rotate function, the output signal of the first basic operation device, and a constant "1",
a second rotate function rotating an output signal of the second basic operation device a number of positions equal to the value of a second ordered rotate constant of the rotate constants,
a third basic operation device performing the basic operation using the output signal of the second basic operation device, an output signal of the second rotate function, and the second round operation key,
a third rotate function rotating an output signal of the third basic operation device a number of positions equal to the value of a third ordered rotate constant of the rotate constants, and
a fourth basic operation device performing the basic operation using the mode selection signal, the output signal of the third basic operation device, an output signal of the third rotate function, and the second data stream, and
wherein the basic operation is selected from one of an addition operation, a subtraction operation, and an operation of the locations of the basic operation devices.

17. The system of claim 16, wherein the output signal of the first multiplexer contains 64 bits, and each of the first data stream and the second data stream includes 32 bits.

18. An M6 block cipher system that performs a plurality of round operations in order to authenticate a device for receiving/transmitting content and encoding content, in which each of the plurality of round operations includes a plurality of sub round operations, the system comprising:
a rotate constant selector device selecting one or more rotate constants from a plurality of input rotate constants for output based on a selection signal input thereto,
a rotate constant ordering device ordering, for output, each of the selected rotate constants, a separately received common rotate constant and a separately received non-common rotate constant, in response to the rotate constant selection signal,
an M6 core device generating one or more of an output signal, a validity signal, a round number and a sub round number based on the ordered rotate constants and a plurality of input signals, and a rotate constant scheduler device outputting the ordering signal to the rotate constant ordering device in response to the selection signal, the round number and the sub round number.

19. The system of claim 18, wherein the selection signal determines whether to encode content or to generate a random number and create an exchange key for device authentication.

20. The system of claim 18, wherein the plurality of rotate constants input to the rotate constant selector includes two rotate constants used to encode content, and two rotate constants used to generate the random number and create an exchange key for device authentication.

21. The system of claim 18, wherein the ordering signal indicates the order of the selected rotate constants to be used for a round operation.

22. The system of claim 18, wherein
the common rotate constant is used to encode content and for device authentication, and
the non-common rotate constant is used when an output signal is not rotated.

23. The system of claim 18, wherein the input signals to the M6 core include one or more of an input text signal, a key signal, an operation start signal and a mode selection signal.

24. The system of claim 18, wherein the input signals to the M6 core include each if a key signal, an operation start signal, a mode selection signal and an input text signal.

25. The system of claim 24, wherein
the operation start signal instructs the M6 core to start operation,
the key signal is used to create two round operation keys, one key for each round of operation of the M6 core, and
the mode selection signal instructs the M6 core as to whether to encode or decode a given input text signal.

26. The system of claim 25, wherein
if the given input text signal is plain text, the mode selection signal instructs the M6 core to encode the input plain text signal, else
if the given input text signal is cipher text, the mode selection signal instructs the M6 core to decode the input cipher text signal.

27. The system of claim 18, wherein the M6 core outputs each of an output signal, a validity signal, a round number and a sub round number based on the ordered rotate constants and plurality of input signals.

28. The system of claim 27, wherein
the round number generated by the M6 core contains information on a present round operation,
the sub round number contains information on a present sub round operation performed in the present round,
the output signal is generated by encoding or decoding one of an input plain text or an input cipher text signal which are contained in the input signals to the M6 core, and
the validity signal indicates an end of encoding and decoding and the validity of an encoded or decoded value in response to the given ordered rotate constant.

29. The system of claim 18, wherein the M6 block cipher system performs a single round during a single clock cycle.

30. The system of claim 18, wherein the M6 core comprises:
a first multiplexer which, in a first round operation, selects one of the input signals and a round output signal in response to a first control signal,
an M6 core controller generating a second operation start signal that indicates that a round operation is to be performed, the first control signal which instructs the first multiplexer to select a given input signal in the first round operation, the round output signal in another round operation and the validity signal, in response to the round number, the sub round number, and a first operation start signal,
a round key generator generating first and second round operation keys in response to a key signal used to create the two round operation keys, one key for each round of operation of the M6 core, and
a Pi function outputting the round number, the sub round number, and the round output signal obtained by performing a round operation on an output signal of the first multiplexer in response to the ordered rotate constants, the first and second round operation keys, and a mode selection signal to instruct the M6 core as to whether to encode or decode a given one of the input signals.

31. The system of claim 30, wherein the M6 core further receives a first operation start signal which instructs the M6 core to start operating, and the M6 core controller operates in response to the first operation start signal.

32. The system of claim 30, wherein the second operation start signal instructs the Pi function to start operating.

33. The system of claim 30, wherein
an output signal of the first multiplexer is divided into consecutive first and second data streams, and
the Pi function comprises:
a first basic operation device performing a basic operation using the first and second round operation keys, a constant "1", and the first data stream,
a rotate function rotating an output signal of the first basic operation device a number of positions equal to the value of the ordered rotate constant, and
a second basic operation device performing the basic operation using an output signal of the rotate function, the output signal of the first basic operation device, and the second data stream, and
wherein the first basic operation device and the second basic operation device operate in response to the mode selection signal and the sub round number, the first and second basic operations selected from one of an addition operation, a subtraction operation and an operation of the locations of the basic operating devices.

34. The system of claim 33, wherein the first basic operation device performs the basic operation using:
the first round operation key and the first data stream L during a first sub round of each round,
the output signal of the second basic operation device and the constant "1" during each of a second sub round through a round before a final sub round of each round, and
the second round operation key and the output signal of the second basic operation device during the final sub round.

35. The system of claim 33, wherein the second basic operation device uses the second data stream during a final sub round of each round.

36. The system of claim 30, wherein the output signal of the first multiplexer contains 64 bits, and the first data stream and the second data stream includes 32 bits.

37. The system of claim 18, wherein the number of sub rounds is one of three, four or six sub rounds.

38. A method of encoding content and performing authenticating of a device, comprising:
selecting one or more rotate constants from a plurality of input rotate constants for output based on a selection signal configured to determine whether to encode content or to generate a random number and create an exchange key for device authentication, ordering the selected rotate constants and one or both of a separate common rotate constant used to encode content and for device authentication, and a separate non-common rotate constant used when an output signal is not rotated, based on an ordering signal, and generating, in an M6 core device, one or more of an output signal, a validity signal and at least one of a round number and a sub round number based on the ordered rotate constants and a plurality of input signals, wherein the ordering signal is generated based on the selection signal and one or both of the round number and sub round number.

39. The method of claim 38, wherein the input signals include a key signal, a operation start signal a mode selection signal and one of an input plain text signal or an input cipher text signal, and the operation start signal instructs a start of operation, the key signal is used to create two round operation keys, one key for each round of operation, and the mode selection signal indicates whether to encode or decode a given one of the input signals.

40. The method of claim 39, wherein if the given input signal is plain text, the mode selection signal represents an instruction to encode the input plain text signal, else if the given input signal is cipher text, the mode selection signal represents an. instruction to decode the input cipher text signal.

41. The method of claim 38, wherein the round number contains information on a present round operation, the sub round number contains information on a present sub round operation performed in the present round, the output signal is generated by encoding or decoding one of an input plain text or an input cipher text signal which are contained in the input signals to the M6 core, and the validity signal indicates an end of encoding and decoding and the validity of an encoded or decoded value in response to the given ordered rotate constant.

42. An M6 block cipher system, comprising:

a rotate constant selector device selecting one or more rotate constants from a plurality of input rotate constants for output based on a selection signal input thereto, a rotate constant ordering device ordering the selected rotate constants and a common rotate constant input thereto based on a received ordering signal, an M6 core device generating one or more of an output signal, a validity signal and a round number based on the ordered rotate constants and a plurality of input signals, and a rotate constant scheduler device outputting the ordering signal to the rotate constant ordering device in response to the selection signal and the round number, wherein the system is configured to encode content and perform authentication of a device in accordance with the method of claim 38.

43. An M6 block cipher system that performs a plurality of round operations in order to authenticate devices for receiving/transmitting content and encode content, in which each of the plurality of round operations includes a plurality of sub round operations, the system comprising:

a rotate constant selector device selecting one or more rotate constants from a plurality of input rotate constants for output based on a selection signal input thereto, a rotate constant ordering device ordering the selected rotate constants, a separately received common rotate constant and a separately received non- common rotate constant ordering the selected rotate constants, and outputting in response to the rotate constant selection signal, an M6 core device generating one or more of an output signal, a validity signal, a round number and a sub round number based on the ordered rotate constants and a plurality of input signals, and a rotate constant scheduler device outputting the ordering signal to the rotate constant ordering device in response to the selection signal, the round number and the sub round number, wherein the system is configured to encode content and perform authentication of a device in accordance with the method of claim 39.

\* \* \* \* \*